UNITED STATES PATENT OFFICE.

CARLETON ELLIS, OF MONTCLAIR, NEW JERSEY.

REMOVING CATALYZER FROM OIL.

1,224,291.
Specification of Letters Patent. Patented May 1, 1917.
No Drawing. Application filed February 5, 1916. Serial No. 76,380.

*To all whom it may concern:*

Be it known that I, CARLETON ELLIS, a citizen of the United States, and a resident of Montclair, in the county of Essex and State of New Jersey, have invented certain new and useful Improvements in Removing Catalyzer from Oil, of which the following is a specification.

This application relates to a method of filtration of hydrogenated oil which has been prepared by the catalytic process employing nickel or similar catalyzer and relates particularly to filtration under conditions enabling the removal of the major portion of small traces of suspended nickel and the like, which cannot be readily removed in other ways.

In the hardening of oils such as cottonseed oil by the use of a nickel catalyzer in the presence of hydrogen especially with catalyzer made from nickel carbonyl and the like a certain amount of nickel tends to become suspended in the oil in a condition approaching the colloidal form and in this condition the nickel passes rather easily through the filter cloths of filter presses employed in the removal of the catalyzer. The presence of this nickel in an edible product is objectionable and its removal is desired.

By my process this may be accomplished in sufficient measure by contacting the oil containing the suspended nickel with hydrated silicic acid or silicate such as a zeolite or even fullers' earth and in some cases kieselguhr, especially weathered kieselguhr which contains some hydrous material. In carrying out this stage it is first necessary in most cases to remove the bulk of the catalytic material by coarse filtration although this may be omitted in some instances. The oil and catalyzer is therefore filtered through an ordinary filter press and the filtered oil is then passed through a bed of hydrated silicic acid or kieselguhr, fullers' earth and the like. This may be carried out in a second filter press and a bed of material may be formed in vertical position on the filter cloths by passing a mixture of fullers' earth, etc., suspended in hardened oil in a molten condition into the filter press, and forcing the hardened oil through the press thus leaving a coating of the silicious material on the filter cloths. When this coating has become of sufficient depth to be able to exert the proper filtering effect on the residual nickel, the press is ready for use for the final filtration to accomplish removal of traces of nickel and for that purpose the oil from the first filter press may be pumped directly to the second filter press. The purified oil is collected and allowed to solidify or used in any manner desired. Silicic acid precipitated on kieselguhr or fullers' earth may be used as a filter bed of high efficiency.

In case other metallic agents such as cobalt are used as catalyzers the method described above may be similarly applied.

In so far as this application relates to the filtration of hardened oils containing nickel, especially finely-divided suspended nickel through a layer or bed or coating of silicious material such as kieselguhr the present application is a continuation of matter disclosed in Serial No. 817,041 filed Feb. 6, 1914.

What I claim is:—

1. A process of treating oily material containing catalyzer in a high state of subdivision, which comprises passing an oily material containing such a catalyzer through a filtering material comprising silicic acid precipitated on a finely divided solid material.

2. A process of treating oily material containing catalyzer in a high state of subdivision, which comprises passing an oily material containing such a catalyzer through a filtering material comprising silicic acid precipitated on fullers' earth.

CARLETON ELLIS.